(12) United States Patent
Lin

(10) Patent No.: US 8,611,713 B2
(45) Date of Patent: Dec. 17, 2013

(54) OPTICAL CABLE AND METHOD FOR MANUFACTURING THE OPTICAL CABLE

(75) Inventor: I-Thun Lin, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/596,297

(22) Filed: Aug. 28, 2012

(65) Prior Publication Data
US 2013/0163940 A1    Jun. 27, 2013

(30) Foreign Application Priority Data
Dec. 27, 2011 (TW) .............................. 100148902 A

(51) Int. Cl.
  *G02B 6/44* (2006.01)
  *B29D 11/00* (2006.01)
(52) U.S. Cl.
  USPC ........... 385/109; 385/100; 385/104; 385/106; 385/108; 385/111; 264/1.1; 264/1.24; 264/1.7; 264/2.4; 264/2.7

(58) Field of Classification Search
  USPC ........... 385/100–113; 264/1.1, 1.24, 1.7, 2.4, 264/2.7
  See application file for complete search history.

(56) References Cited

U.S. PATENT DOCUMENTS 3,817,595 A * 6/1974 Edelman et al. .............. 385/115
2010/0233146 A1* 9/2010 McDaniel .................... 424/94.2

* cited by examiner

*Primary Examiner* — K. Cyrus Kianni
*Assistant Examiner* — Hung Lam
(74) *Attorney, Agent, or Firm* — Altis Law Group, Inc.

(57) ABSTRACT

An optical cable includes an optical fiber, a primary coating coated on the optical fiber, and an outer coating coated on the primary coating. The optical cable is spiral, and can be compressed or stretched. The outer coating comprises about 40 to 70 weight percent of caoutchouc, about 20 to 50 weight percent of neoprene, about 0 to 6 weight percent of magnesium oxide, about 0 to 6 weight percent of zinc oxide, and about 0 to 6 weight percent of vulcanization accelerator.

10 Claims, 4 Drawing Sheets

OPTICAL CABLE AND METHOD FOR MANUFACTURING THE OPTICAL CABLE

BACKGROUND

1. Technical Field

The present disclosure relates to optical cables, particularly to a curved optical cable and a method for manufacturing the optical cable.

2. Description of Related Art

As the fiber to the home (FTTH) is widely used in communication field, the optical cable is more widely used. The optical cable is typically used for connecting two optical connectors. As the optical fiber of the optical cable is prone to be fractured, the optical cable connected to the two optical connectors must be in a certain length for matching with the distance between the two optical connectors. Thus, it is inconvenient for layperson to easily use the optical cable.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the optical cable and method for manufacturing the same. Moreover, in the drawings, like reference numerals designate corresponding parts throughout the several views. Wherever possible, the same reference numerals are used throughout the drawings to refer to the same or like elements of an embodiment.

DETAILED DESCRIPTION

Figure 1:
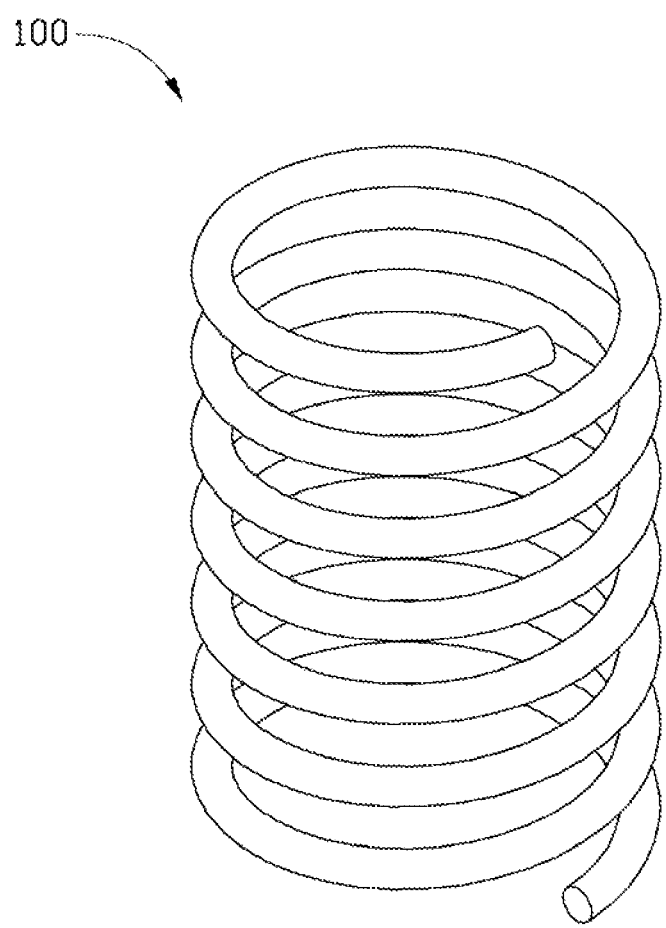
FIG. 1 is an isometric, assembled view of an embodiment of an optical cable in a relaxed state.
Figure 2:
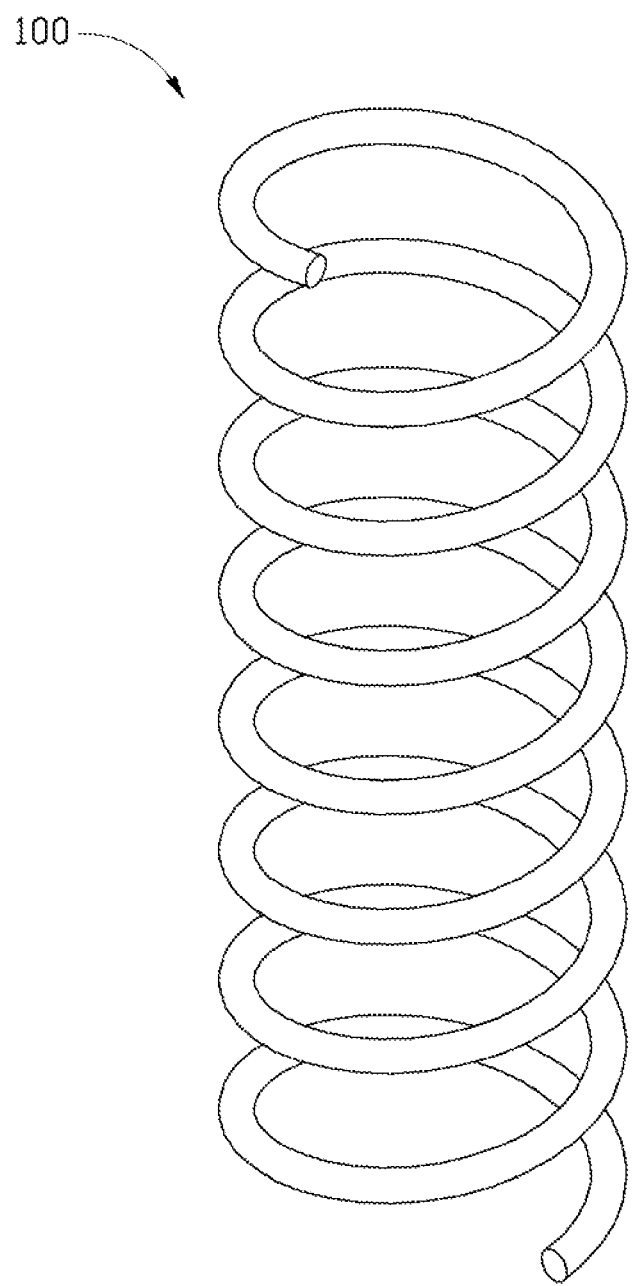
FIG. 2 is an isometric, assembled view of an embodiment of the optical cable in a stretched state.
Figure 3:
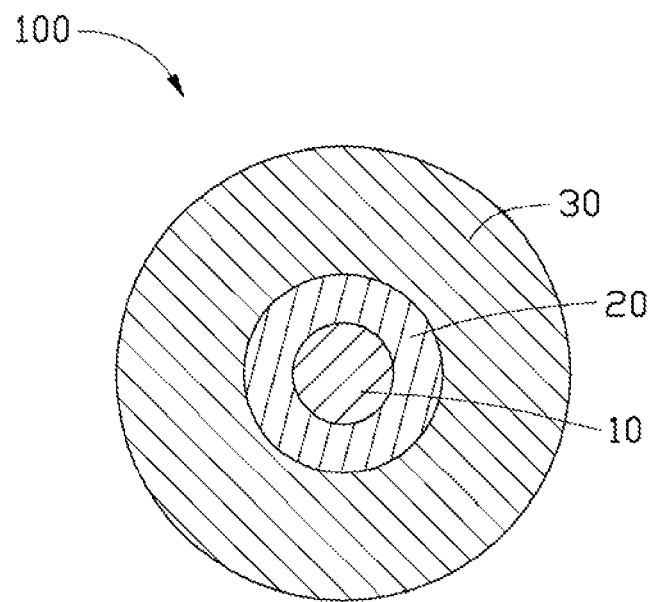
FIG. 3 is a cross-sectional view of the fiber cable of FIG. 1.

Referring to FIGS. 1 through 3, an embodiment of an optical cable 100 is shown. The optical cable 100 is used for connecting two connectors (not shown). In the illustrated embodiment, the optical cable 100 is substantially spiral, when the optical cable 100 is compressed or stretched, the external force it exerts is proportional to its change in length. The optical cable 100 includes an optical fiber 10, a primary coating 20 coated on the optical fiber 10, and an outer coating 30 coated on the primary coating 20.

In the illustrated embodiment, the optical fiber 10 is a flexible, transparent fiber made of a single-mode glass fiber. In alternative embodiments, the optical fiber 10 can be a flexible, transparent fiber made of plastic materials.

The primary coating 20 is used for reducing the light loss of the light transmitted by the optical fiber 10, and is made of plastic materials having an in-situ modulus of less than 0.65 Mpa and a glass transition temperature (Tg) below −50° C. In the illustrated embodiment, the primary coating 20 is made of polyurethane-acrylate.

The outer coating 30 is used for protecting the optical fiber 10 from fracturing and increasing the flexibility of the optical fiber 10. In the illustrated embodiment, the outer coating 30 includes about 40 to 70 weight percent of caoutchouc, about 20 to 50 weight percent of neoprene, about 0 to 6 weight percent of magnesium oxide, about 0 to 6 weight percent of zinc oxide, and about 0 to 6 weight percent of vulcanization accelerator.

Figure 4:
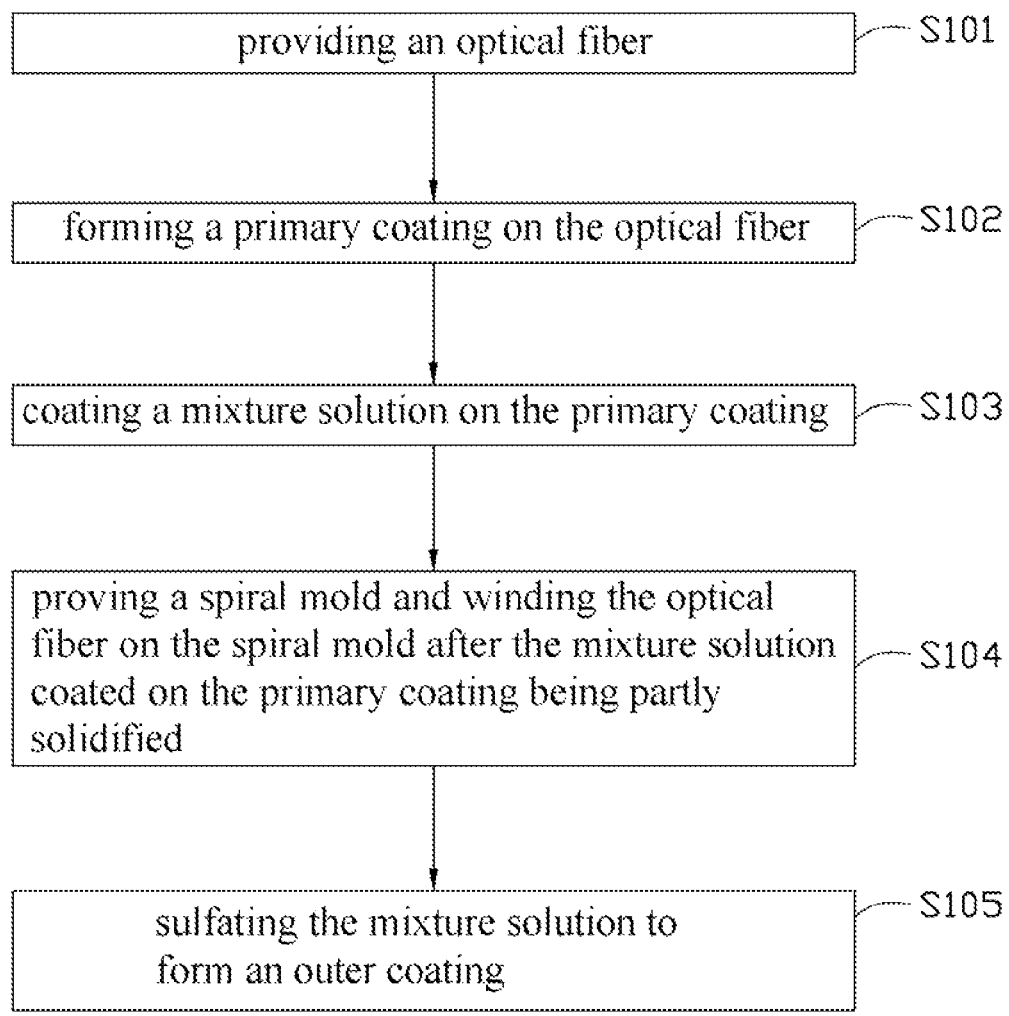
FIG. 4 is a flowchart of a method for manufacturing processes of the optical cable of FIG. 1.

Also referring to FIG. 4, an embodiment of a method for manufacturing the optical cable 100 is illustrated as follows.

In step S101: an optical fiber is provided. In the illustrated embodiment, the optical fiber is a flexible, transparent fiber made of glass.

In step S102: a primary coating is formed on the optical fiber. In the illustrated embodiment, the primary coating is formed by polyurethane-acrylate cured by ultraviolet radiation.

In step S103: a mixture solution is coated on the primary coating. In the illustrated embodiment, the mixture solution includes about 40 to 70 weight percent of caoutchouc, about 20 to 50 weight percent of neoprene, about 0 to 6 weight percent of magnesium oxide, about 0 to 6 weight percent of zinc oxide, and about 0 to 6 weight percent of vulcanization accelerator.

In step S104: a spiral mold is provided and the optical fiber is wound on the spiral mold after the mixture solution coated on the primary coating being partly solidified.

In step S105: the mixture solution is sulfated to form an outer coating.

A first embodiment of the optical cable includes an optical fiber, a primary coating coated on the optical fiber, and an outer coating coated on the primary coating. The optical fiber is a flexible, transparent fiber made of glass. The primary coating is formed by polyurethane-acrylate cured by ultraviolet radiation. The mixture solution includes 70 weight percent of caoutchouc, 20 weight percent of neoprene, 3 weight percent of magnesium oxide, 4 weight percent of zinc oxide, and 3 weight percent of vulcanization accelerator.

A second embodiment of the optical cable is similar to the first embodiment, except that the mixture solution includes 40 weight percent of caoutchouc, 50 weight percent of neoprene, 1 weight percent of magnesium oxide, 3 weight percent of zinc oxide, and 6 weight percent of vulcanization accelerator.

A third embodiment of the optical cable is similar to the first embodiment, except that the mixture solution includes 50 weight percent of caoutchouc, 40 weight percent of neoprene, 2 weight percent of magnesium oxide, 2 weight percent of zinc oxide, and 6 weight percent of vulcanization accelerator.

A fourth embodiment of the optical cable is similar to the first embodiment, except that the mixture solution includes 45 weight percent of caoutchouc, 45 weight percent of neoprene, 4 weight percent of magnesium oxide, and 6 weight percent of vulcanization accelerator.

The outer coating 30 of the optical cable 100 includes about 40 to 70 weight percent of caoutchouc and about 20 to 50 weight percent of neoprene. The caoutchouc has an excellent resiliency, when the optical cable 100 is compressed or stretched, the optical cable 100 can return to its original state after the withdrawal of an external force has been acted on the optical cable 100. The neoprene has an excellent mechanical strength, which can make the optical cable 100 maintain the original state for a long time. The length of the optical cable 100 can be adjusted to satisfy data transmission at different distances.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An optical cable, comprising:
an optical fiber;

a primary coating coated on the optical fiber; and an outer coating coated on the primary coating, wherein the optical cable is spiral and can be compressed or stretched, and the outer coating comprises about 40 to 70 weight percent of caoutchouc, about 20 to 50 weight percent of neoprene, about 0 to 6 weight percent of magnesium oxide, about 0 to 6 weight percent of zinc oxide, and about 0 to 6 weight percent of vulcanization accelerator.

2. The optical cable of claim 1, wherein the primary coating is made of plastic materials having an in-situ modulus of less than 0.65 Mpa and a glass transition temperature below −50° C.

3. The optical cable of claim 2, wherein the primary coating is made of polyurethane-acrylate.

4. The optical cable of claim 1, wherein the optical fiber is a flexible, transparent fiber made of a single-mode glass fiber.

5. The optical cable of claim 1, wherein the optical fiber is a flexible, transparent fiber made of plastic materials.

6. A method for manufacturing an optical cable, comprising:

providing an optical fiber;

forming a primary coating on the optical fiber;

coating a mixture solution on the primary coating;

proving a spiral mold and winding the optical fiber on the spiral mold after the mixture solution coated on the primary coating being partly solidified; and sulfating the mixture solution to form an outer coating, the outer coating comprising about 40 to 70 weight percent of caoutchouc, about 20 to 50 weight percent of neoprene, about 0 to 6 weight percent of magnesium oxide, about 0 to 6 weight percent of zinc oxide, and about 0 to 6 weight percent of vulcanization accelerator.

7. The method for manufacturing an optical cable of claim 6, wherein the primary coating is made of plastic materials having an in-situ modulus of less than 0.65 Mpa and a glass transition temperature below −50° C.

8. The method for manufacturing an optical cable of claim 7, wherein the primary coating is made of polyurethane-acrylate.

9. The method for manufacturing an optical cable of claim 6, wherein the optical fiber is a flexible, transparent fiber made of a single-mode glass fiber.

10. The method for manufacturing an optical cable of claim 6, wherein the optical fiber is a flexible, transparent fiber made of plastic materials.

* * * * *